Sept. 1, 1925. Re. 16,154
L. W. MACOMBER
DISPLAY STAND
Original Filed Feb. 11, 1924
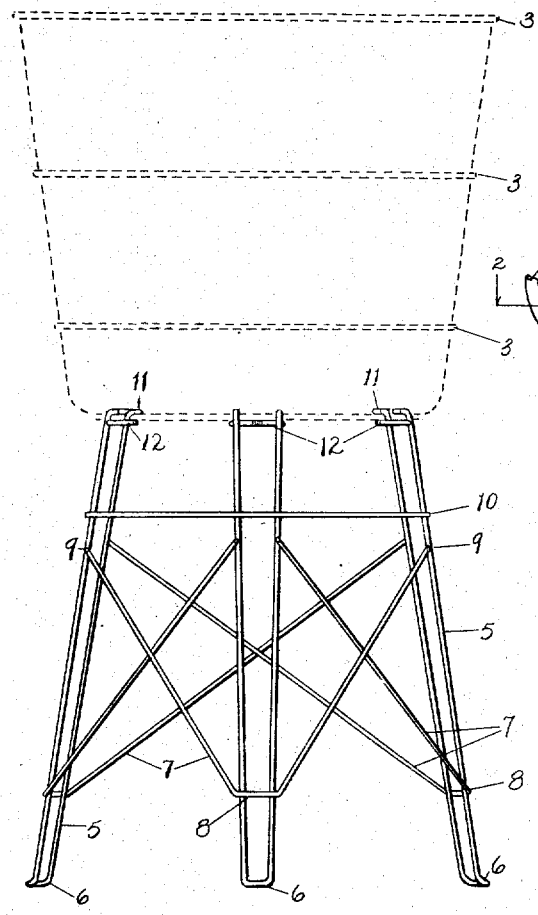
Fig. I.
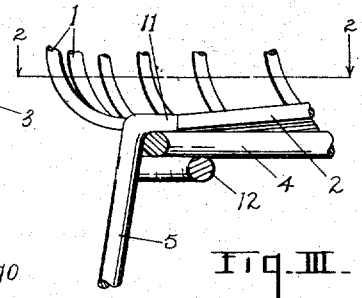
Fig. III.
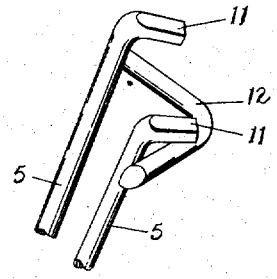
Fig. IV.
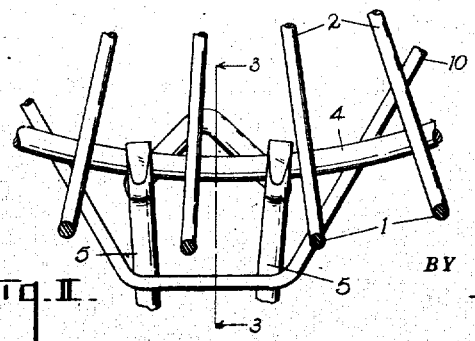
Fig. II.
INVENTOR
Lynn W. Macomber
BY
Chappell & Earl
ATTORNEYS Reissued Sept. 1, 1925.

Re. 16,154

UNITED STATES PATENT OFFICE.

LYNN W. MACOMBER, OF BATTLE CREEK, MICHIGAN, ASSIGNOR TO UNITED STEEL AND WIRE COMPANY, OF BATTLE CREEK, MICHIGAN.

DISPLAY STAND.

Original No. 1,522,961, dated January 13, 1925, Serial No. 692,074, filed February 11, 1924. Application for reissue filed June 5, 1925. Serial No. 35,242.

*To all whom it may concern:*

Be it known that I, LYNN W. MACOMBER, a citizen of the United States, residing at Battle Creek, county of Calhoun, State of Michigan, have invented certain new and useful Improvements in Display Stands, of which the following is a specification.

This invention relates to improvements in display stands.

The main object of this invention is to provide an improved display stand for supporting wire baskets or receptacles for the displaying of merchandise such as fruit, small articles in self-serve stores and the like which may also be used for general purposes as a stand or support, the receptacle being detachably secured to the stand.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is an elevation of my improved display stand, the receptacle being illustrated by dotted lines mounted thereon.

Fig. II is a fragmentary section on a line corresponding to line 2—2 of Fig. III.

Fig. III is a fragmentary section on a line corresponding to line 3—3 of Fig. II.

Fig. IV is a perspective view of the upper end of one of the legs.

In the drawing similar reference characters refer to similar parts throughout the several views, and the sectional views are taken looking in the direction of the little arrows at the ends of the section lines.

The basket illustrated is formed of metal and comprises the side and bottom slats 1 and 2 formed integrally of wire. The receptacle is provided with side hoops 3 and a bottom hoop 4, the bottom hoop being disposed adjacent the angles of the slat members.

My improved stand comprises legs 5, each formed of a piece of wire folded upon itself with a bight portion 6 thereof outwardly offset to provide feet. These legs are connected and braced by the U-shaped brace members 7, the bight portions 8 of which are secured to the legs adjacent their lower ends, the arms of the legs being secured to the leg members at 9.

A hoop-like cross member 10 embraces and is secured to the legs just above the points of connection for the braces 7 thereto. This forms connections for the legs but permits their outer ends being sprung out to facilitate the engagement of the lugs or hooks 11 thereof with the bottom hoop 4 of the basket.

The V-shaped rests 12 are secured to the legs in spaced relation to the lugs 11 so that the bottom hoop rests upon these supports when the lugs 11 are engaged with the hoops between the slats, as clearly shown in Fig. II and Fig. III. This provides an effective and secure connection for the basket to the stand and at the same time permits ready removal therefrom.

When the basket is removed, the stand may be used as a support generally, as for a box or to support a table top or the like.

When the basket is removed, a plurality of the stands may be nested and a plurality of the baskets nested, thereby providing compactness for storage or shipment.

Having thus described my invention, what I claim as new and desire to secure by Letters Patent is:

1. In a display stand, the combination of a receptacle comprising angled slat members and a bottom hoop, legs formed of loops of wire disposed with their bight ends downwardly and constituting feet, the upper ends of the leg members terminating in laterally projecting lugs adapted to be engaged over said hoop between the slat members, V-shaped rests secured to the leg members in spaced relation to said lugs and adapted to support the hoop when the said legs are in engagement therewith, U-shaped braces having their bights secured to said legs adjacent the lower ends thereof and the upper ends of their arms being secured to adjacent legs, and an annular horizontal tie member mounted on said legs in spaced relation to their upper ends whereby their upper ends may be sprung to permit engagement with said hoop.

2. In a display stand, the combination of a receptacle comprising angled slat members and a bottom hoop, legs formed of loops of wire disposed with their bight ends downwardly and constituting feet, the upper ends of the leg members terminating in laterally projecting lugs adapted to be engaged over said hoop between the slot members, and V-shaped rests secured to the leg members in spaced relation to said lugs and adapted to support the hoop when the said lugs are in engagement therewith.

3. In a display stand, the combination of a receptacle provided with a bottom hoop, legs formed of loops of wire disposed with their bight ends downwardly, the upper ends of the leg members terminating in laterally projecting lugs adapted to be engaged over said hoop, rests secured to the leg members in spaced relation to said lugs and adapted to support the hoop when the said lugs are in engagement therewith, U-shaped braces having their bights secured to said legs adjacent the lower ends thereof and the upper ends of their arms being secured to adjacent legs, and a horizontal tie member mounted on said legs in spaced relation to their upper ends whereby their upper ends may be sprung to permit engagement with said hoop.

4. In a display stand, the combination of a receptacle provided with a bottom hoop, legs formed of loops of wire disposed with their bight ends downwardly, the upper ends of the leg members terminating in laterally projecting lugs adapted to be engaged over said hoop, and rests secured to the leg members in spaced relation to said lugs, the upper ends of the legs being adapted to be sprung to facilitate the engagement of the hoop between the lugs and the rests.

5. In a display stand, the combination of legs formed of loops of wire disposed with their bight ends downwardly, the upper ends of the leg members terminating in laterally projecting receptacle engaging lugs, rests secured to the leg members in spaced relation to said lugs and adapted to support a receptacle when the said lugs are in engagement therewith, connecting braces for said legs, and a horizontal tie member mounted on said legs in spaced relation to their upper ends whereby their upper ends may be sprung to permit engagement with a receptacle.

6. In a display stand, the combination of a receptacle provided with a bottom hoop, of legs formed of wire and terminating at their upper ends in laterally directed lugs and provided with rests disposed in spaced relation to said lugs so that said lugs may be sprung over the bottom hoop of the receptacle to resiliently engage the same.

7. In a display stand, the combination of legs formed of wire provided at their upper ends with laterally directed receptacle engaging lugs, and bracing means for said legs including a horizontal cross member disposed in spaced relation to the upper ends of said legs whereby the upper ends of the legs may be sprung to receive a receptacle and resiliently engage the same.

In witness whereof, I have hereunto set my hand.

LYNN W. MACOMBER.